United States Patent [19]

Matsumi et al.

[11] Patent Number: 5,416,600
[45] Date of Patent: May 16, 1995

[54] CONCEALING METHOD OF VIDEO SIGNAL

[75] Inventors: Chiyoko Matsumi, Suita; Tatsuro Juri, Osaka, both of Japan

[73] Assignee: Matsushita Electric Industrial Co., Ltd., Osaka, Japan

[21] Appl. No.: 291,460

[22] Filed: Aug. 17, 1994

Related U.S. Application Data

[63] Continuation of Ser. No. 744,377, Aug. 13, 1991, abandoned.

[30] Foreign Application Priority Data

Aug. 16, 1990 [JP] Japan ................................. 2-216882

[51] Int. Cl.$^6$ .............................................. H04N 5/94
[52] U.S. Cl. ..................... 358/335; 358/336; 348/616; 348/620
[58] Field of Search .............. 358/335, 340, 314, 336, 358/319; 348/616, 620, 390; 360/33.1, 32, 38.1; H04N 5/94, 9/88

[56] References Cited

U.S. PATENT DOCUMENTS

| | | | |
|---|---|---|---|
| 4,638,380 | 1/1987 | Wilkinson | 360/22 |
| 4,716,565 | 12/1987 | Suma | 371/31 |
| 4,807,033 | 2/1989 | Keesen et al. | 348/616 |
| 4,891,699 | 1/1990 | Hamada et al. | 358/136 |
| 5,148,290 | 9/1992 | Yamaguchi et al. | 358/314 |

FOREIGN PATENT DOCUMENTS

| | | |
|---|---|---|
| 0373924A1 | 6/1990 | European Pat. Off. . |
| 0415699A2 | 3/1992 | European Pat. Off. . |
| 2072457A | 9/1981 | United Kingdom . |
| WO87/02210 | 4/1987 | WIPO . |

Primary Examiner—Tommy P. Chin
Assistant Examiner—Huy Nguyen
Attorney, Agent, or Firm—Wenderoth, Lind & Ponack

[57] ABSTRACT

A coded digital video signal is obtained by dividing a digital video signal into plural pages each composed of K fields of pixel data, decomposing pixel data in each two pages into plural blocks each composed of a predetermined number of pixel data, and encoding the pixel data in each block by bit rate reduction encoding and error correction encoding. The thus obtained coded digital video signal is reproduced or transmitted and then subjected to a concealment process. The concealment process includes decoding the coded digital video signal to obtain reproduced blocks of pixel data and to detect an error block containing an error among the reproduced blocks, composing the reproduced blocks to obtain plural reproduced pages of pixel data, and concealing error pixel data contained in the error block in each two reproduced pages. Error pixel data in a first page is concealed using pixel data in a previous page, and error pixel data in a second page is concealed using pixel data in a succeeding page.

12 Claims, 10 Drawing Sheets

CONCEALING METHOD OF VIDEO SIGNAL

This application is a continuation of now abandoned application, Ser. No. 07/744,377, filed Aug. 13, 1991, now abandonment.

BACKGROUND OF THE INVENTION

1. Field of the Invention

The present invention relates to a method of concealing a video signal when an incorrectable error is detected during recording and reproduction of or during transmission of a digital video signal, and to an apparatus for performing the method.

2. Description of the Prior Art

A video signal is generally divided into specific blocks, and is recorded and reproduced using a recording medium or transmitted through a transmission path, in such a manner that transmission errors occur that can be detected, but cannot be corrected. Supposing that one page of digital video data is composed of K fields (K being an integer), and that the data in two pages are divided to form blocks, a detected errors was, hitherto, concealed by replacment with a block in one page before a page including a block containing the detected error.

Supposing, in a high efficiency coding, or bit rate reduction, by forming the data in two pages into blocks, that the first page and the second page are combined, and the third page and the fourth page are combined. At the time of reproduction, if an error is detected in a block composed of pixels of the third page and pixels of the fourth page, the pixels are respectively replaced with the pixels at the same positions on the screen of the second page. In a case of a still image, the pixels of the third page may be replaced by the pixels at the same positions of the first page, and the pixels of the fourth page by the pixels at the same positions of the second page. Since the video signal is very high in correlation between pages, it is possible to reproduce a block having a detected error by such concealing.

In this constitution, however, when the video signals are processed in two pages, if an error is detected, there exists a portion of no picture change over three or four pages. Accordingly, in a video signal having a large amount of motion, a significant degradation of picture quality arises, and on the moment of changing the scenes, in particular, the previous picture overlays on the new picture.

SUMMARY OF THE INVENTION

It is hence a primary object of the invention to present a method and an apparatus for concealing a video signal to obtain a picture having less degradation of picture quality in a simple manner.

To achieve the above object, the invention presents a method of concealment characterized by composing one page of digital video signals in K fields (K being an integer), decomposing data in two pages into blocks, compressing the data by bit rate reduction and recording and reproducing or transmitting the compressed data, in which of an error to be concealed over two pages, a portion corresponding to a first page is concealed by using signals of a preceding page or both signals spatially adjacent to a signal in which the error is detected and the signals in the preceding page, while a portion corresponding to a second page is concealed by using signals of a succeeding page or both the signals spatially adjacent to the signal in which the error is detected and the signals in the succeeding page. Accordingly, in concealing a block having an error, the signals in a page adjacent in terms of time are used for each page, so that degradation of picture quality is less obvious.

For the moving picture, the above method is employed, and for the still picture, the portion corresponding to the first page of the signals in which an error is detected is concealed by replacement with signals at the same positions in two pages before, while the portion corresponding to the second page, by replacement with signals at the same positions in two pages before. As a result, the degradation of picture quality is much less obvious.

On the other hand, the above concealment is realized by first switchover means for receiving page data obtained by reproducing, expanding and composing the block data, a page memory for receiving an output of the first switchover means, second switchover means for receiving an output of the page memory, third switchover means for connecting or disconnecting the output of the first switchover means and an output of the second switchover means, and means for controlling the page memory and the first through third switchover means.

According to the invention, error may be concealed in a simple circuit structure, so that the degradation of picture quality may be less obvious, and its practical effect is advantageous.

BRIEF DESCRIPTION OF THE DRAWINGS

FIG. 4(a) –4(f) are diagrams showing an example of error concealing by the first error concealing method of the invention;

FIG. 7(a)–7(h) are operation explanatory diagrams of the concealing apparatus of the first embodiment of the invention;

FIG. 11(a)–11(c) are operation explanatory diagrams of the filter in the third embodiment of the invention.

DESCRIPTION OF THE PREFERRED EMBODIMENTS

Figure 1:
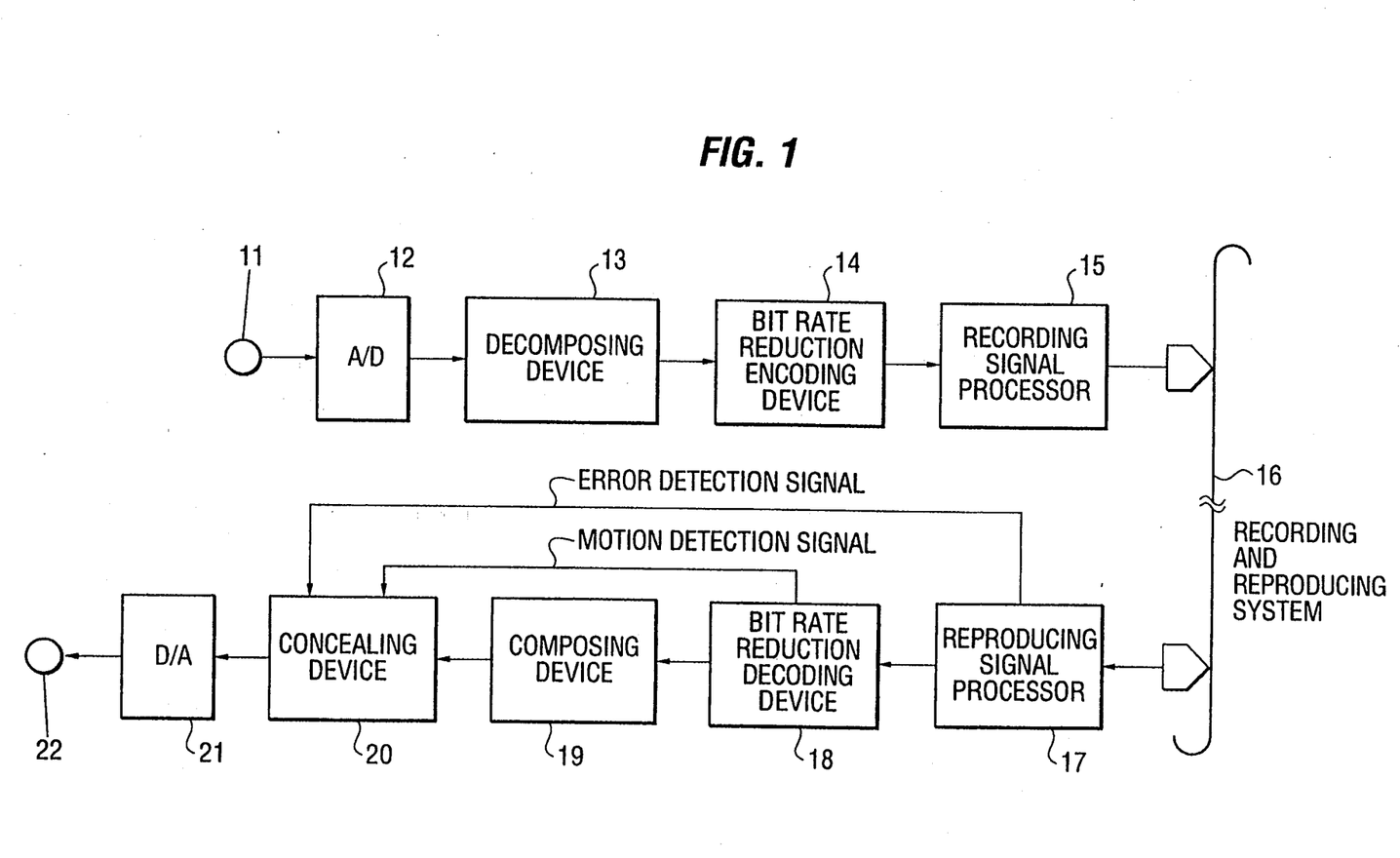
FIG. 1 is a block diagram of recording and reproducing of digital video signal.
Figure 2:
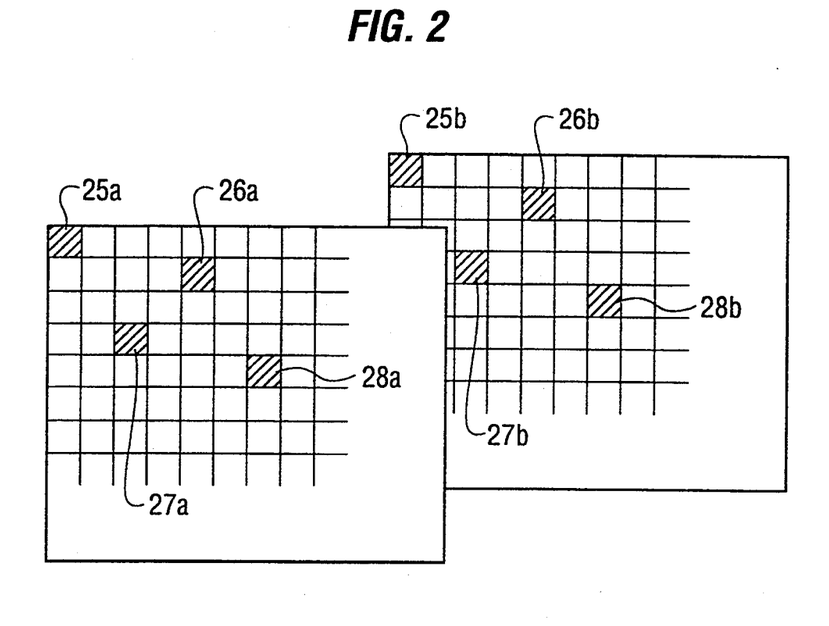
FIG. 2 is an explanatory diagram of block forming in two pages.

FIG. 1 is a block diagram of recording and reproducing of digital video signal. In FIG. 1, numeral 11 is a signal input unit, 12 is an A/D converter, 13 is a decomposing device, 14 is a bit rate reduction encoding device, 15 is a recording signal processor, 16 is a recording and reproducing system, 17 is a reproducing signal processor, 18 is a bit rate reduction decoding device, 19 is a composing device, 20 is a concealing device, 21 is a D/A converter, and 22 is a signal output unit. The video signal fed in the signal input unit 11 is A/D converted in the A/D converter 12, and the page data is decomposed into data blocks in every two pages in the decomposing device 13. One page of video signals is supposed to be composed of K fields (K being an integer). Forming of data blocks is as shown in FIG. 2, in which each page is divided into several rectangles, and four sets of rectangles located at the same positions on the combined two pages, that is, 25a, 25b, 26a, 26b, 27a, 27b, 28a, 28b are formed into one data block. This combination of the rectangles is arbitrary, and only an example is given herein. In other words, the number of sets of rectangles to form one data block is not specified. For example, one data block may be formed of one set of rectangles 25a and 25b. In the decomposing device 13, the data fed in each line is delivered in the block unit. After compressing in the bit rate reduction encoding device 14, and the processing such as error correction coding and modulation in the recording signal processor 15, the data is recorded in the recording and reproducing system 16. The signal reproduced from the recording and reproducing system 16 is demodulated in the reproducing signal processor 17, and is corrected of error. An error detection signal is added to an error which has been detected but has not been corrected. After expanding in the bit rate reduction decoding device 18, the data block in two pages are restored to the two page data in the composing device 19. Afterwards, in the concealing device 20, the error not corrected by the reproducing signal processor 17 is concealed, and the signal is D/A converted in the D/A converter 21, and is delivered from the signal output unit 22. In this case, if the input and output are both digital, the A/D converter 12 and D/A converter 21 are not necessary. Concealment may be either done alone by the concealing device 20, or by cooperation with the reproducing signal processor 17 or composing device 19. In the bit rate reduction decoding device 18, since each data block has information over two pages (2K fields), it is checked whether the video signal is a moving picture or a still picture in each data block, and if necessary, a motion detection signal is added. If, however, motion detection is incorporated in the bit rate reduction itself, the signal may be used directly. To output the error detection signal or motion detection signal, the signal lines parallel to the data are used, but these may be also multiplexed to the data. When the error detection signal or motion detection signal is delivered through the concealing device 20, the deviation in processing time from the data must be taken into consideration. The constitution described herein is only an example, and similar processing may be done in other constitutions, too.

Figure 3:
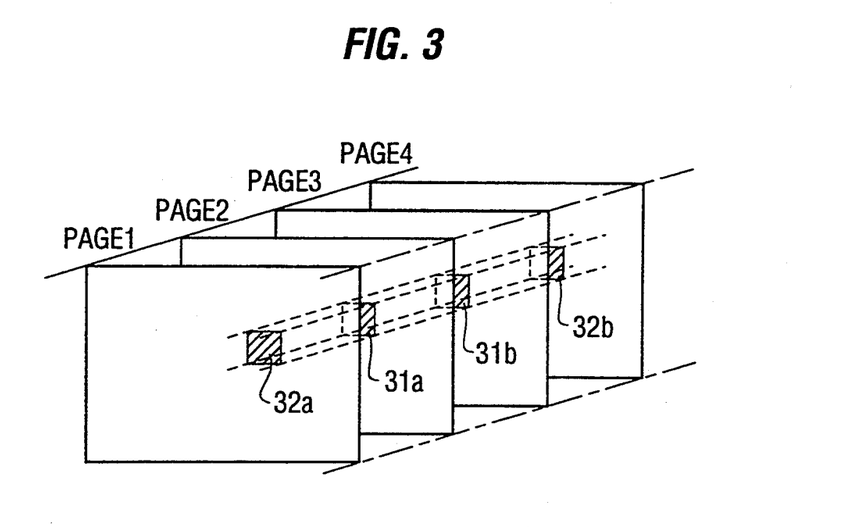
FIG. 3 is an explanatory diagram of a first error concealing method of the invention.
Figure 4A:
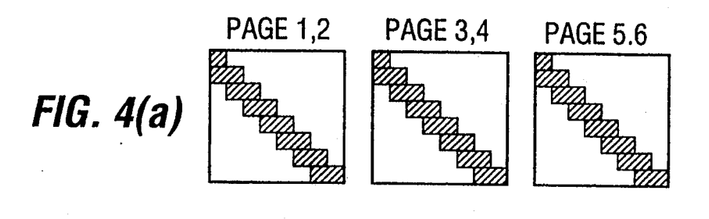
Figure 4B:
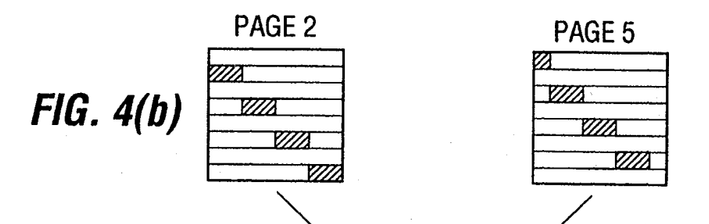
Figure 4C:
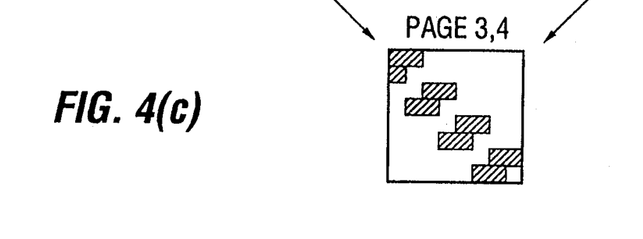
Figure 4D:
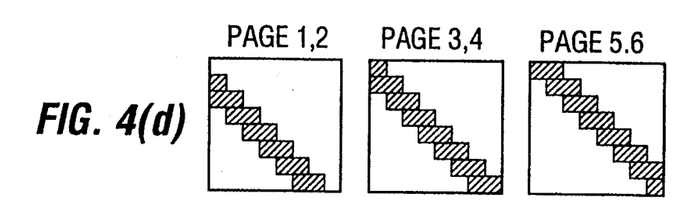
Figure 4E:
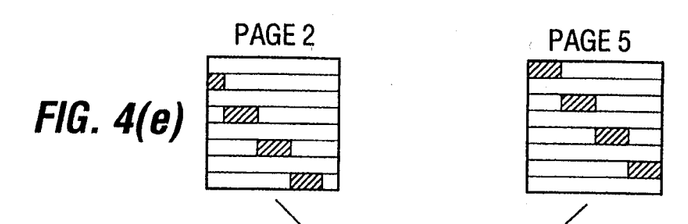
Figure 4F:
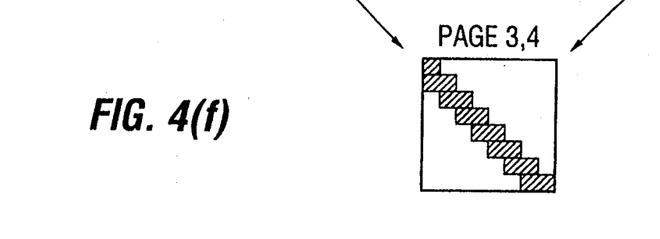

The first concealing method of the invention is described below. Concealment is done by the concealing device 20 shown in FIG. 1. FIG. 3 is an explanatory diagram of the first concealing method. In FIG. 3, numeral 31a is a group of pixels of a first page forming a data block in which an error is detected, 31b is a group of pixels of a second page forming the data block with the detected error, 32a is a group of pixels at the same position on the screen one page before the first page, and 32b is a group of pixels at the same position on the screen one page after the second page. Pages 2 and 3 are combined. So the first and second pages correspond to pages 2 and 3, respectively. In the concealing method of this embodiment, the pixels 31a of page 2 forming the data block in which an error was detected are replaced by the pixels 32a of page 1 adjacent in time, and the pixels 31b of page 3 forming the data block in which an error was detected are replaced by the pixels 32 of page 4 adjacent in time. Thus, according to this first concealing method, since a partial picture in a same page is continues only for two pages, the motion of the picture may be smooth. However, it has its own problem as shown in FIG. 4. FIG. 4 shows examples of concealment. In the example of FIG. 4 (a), the picture is still consecutively for six pages. If pages 3, 4 are concealed, as shown in FIG. 4 (b), the data of the preceding page is used for the data of page 3, and the data of the succeeding page, for the data of page 4. Thus concealed and obtained pages 3, 4 are as shown in FIG. 4 (c), and the difference from the original video signal is significant, and the concealment is very obvious. The example in FIG. 4 (d) is a moving picture extending over six pages. When concealing pages 3, 4, the data of the preceding page is used for the data of page 3, and the data of the succeeding page for the data of page 4, as shown in FIG. 4 (e). Thus concealed and obtained pages 3, 4 are as shown in FIG. 4 (f). There is no difference between the concealed signal and the original signal. Thus, this embodiment is extremely effective with respect to the moving picture, but has a problem with respect to the still picture, and this point is improved in the second concealing method.

The second concealing method of the invention is explained. On the basis of the motion detection signal given by the bit rate reduction decoding device 18, the still picture and moving picture are distinguished, and in the case of a moving picture, it is concealed in the technique of the first concealing method. In case of a still picture, assuming that pages n and n+1 are combined, the first page (page n) is replaced by the data of two pages before (page n−2), and the second page (page n+1) is replaced by the data of two pages before (page n−1), thereby concealing. Thus, according to the second concealing method, whether the still picture or the moving picture, it is possible to effect concealment without substantially degrading the picture quality.

Figure 5:
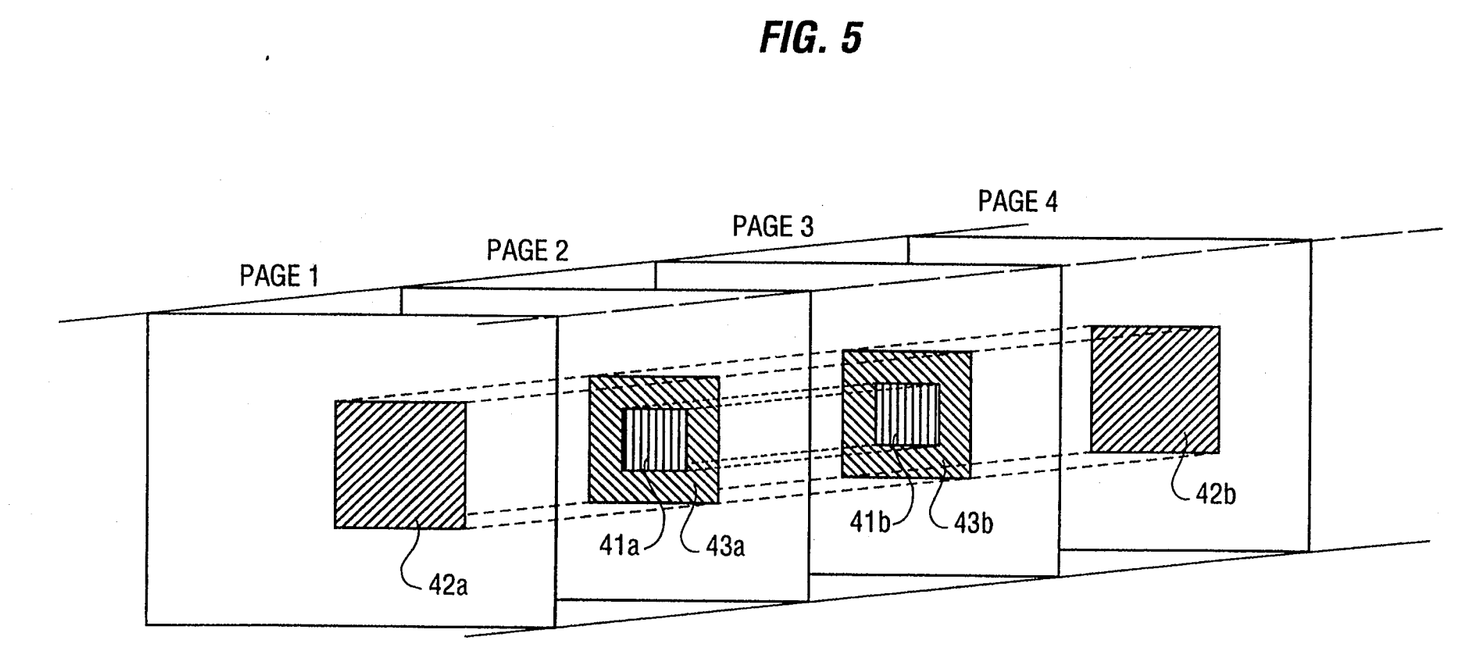
FIG. 5 is an explanatory diagram of a third error concealing method of the invention.

The third concealing method of the invention is explained. FIG. 5 is an explanatory diagram of the third concealing method of the invention. In FIG. 5, numeral 41a is a group of pixels of a first page forming a data block in which an error is detected, 41b is a group of pixels of a second page forming the data block with the detected error, 42a is a group of pixels on the screen one page before the first page, 42b is a group of pixels on the screen one page after the second page, 43a is a group of pixels spatially adjacent to the pixels of the first page forming the data block with the detected error, and 43b is a group of pixels spatially adjacent to the pixel of the second page forming the data block with the detected error. Pages 2 and 3 are combined, so that the first and second pages correspond to pages 2 and 3, respectively. In the third concealing method, the pixels 41a of page 2 forming the data block in which the error was detected are replaced by the values determined from the pixels 42a of page I adjacent in time and the pixels 43a adjacent in space, and the pixels 41b of page 3 forming the data block with the detected error are replaced by values determined from the pixels 42b of page 4 adjacent in time and the pixels 43b adjacent in space. For calculation of determining the concealing values, interpolation calculation and others may be used. Thus, according to the concealing method of this embodiment, since the same page data is not consecutive, the motion of the picture may be smooth.

In all of the first concealing method, second concealing method and third concealing method, supposing one page to be one field, the partial screen is continuous because of the concealing is two fields long, which is the shortest in time, so that the motion of the picture is as desired.

Figure 6:
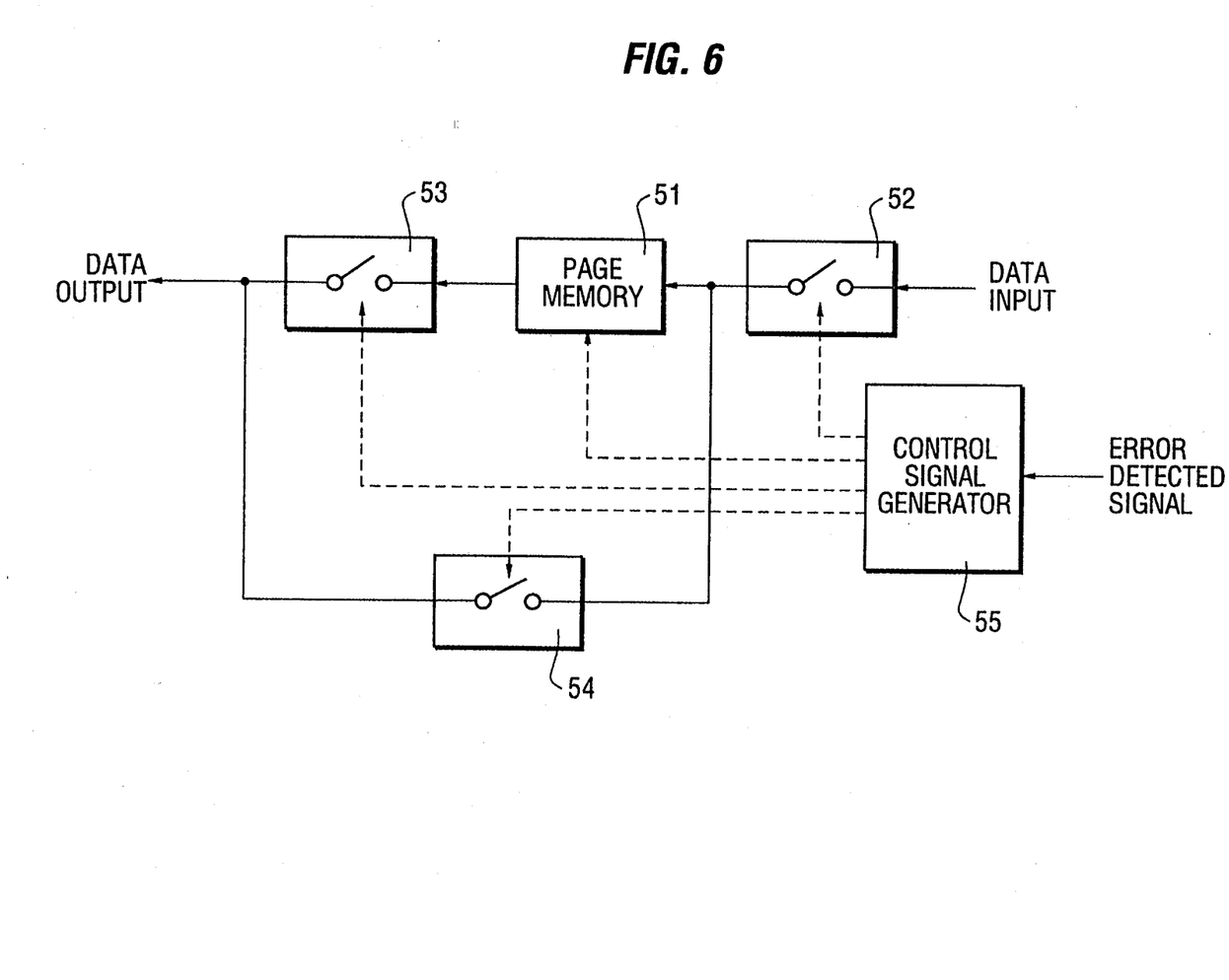
FIG. 6 is a block diagram of a concealing apparatus in a first embodiment of the invention.
Figure 7A:
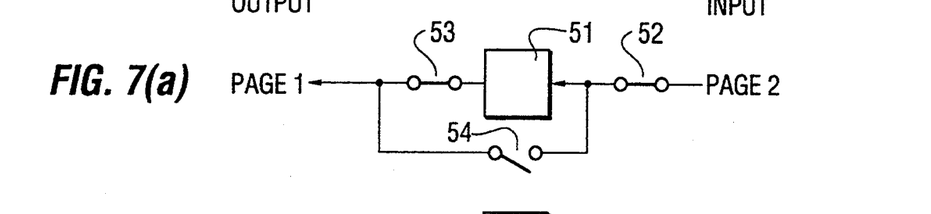
Figure 7B:
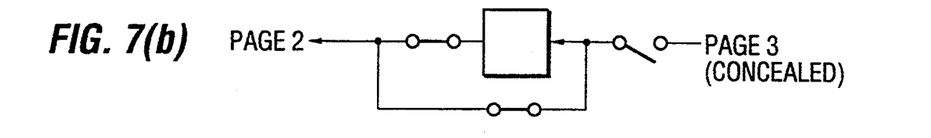
Figure 7C:
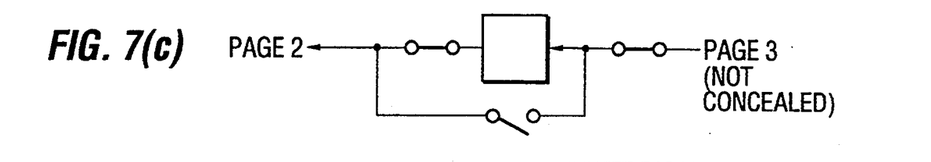
Figure 7D:
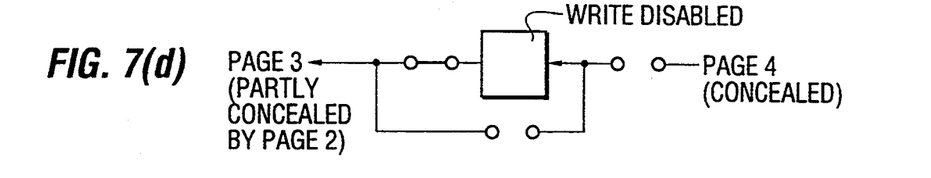
Figure 7E:
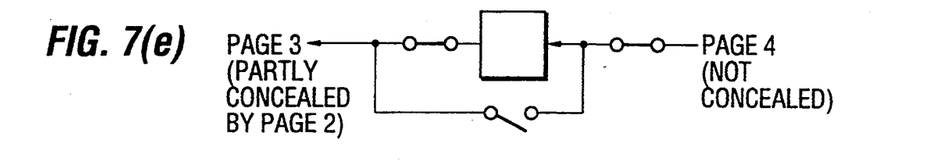
Figure 7F:
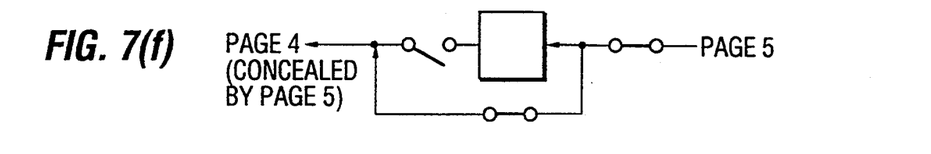
Figure 7G:
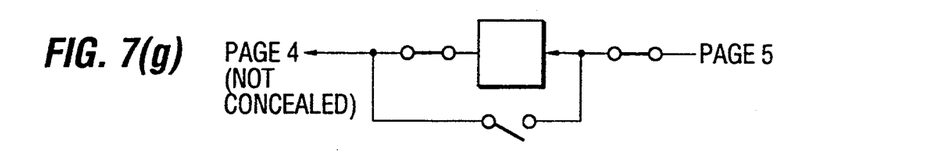
Figure 7H:
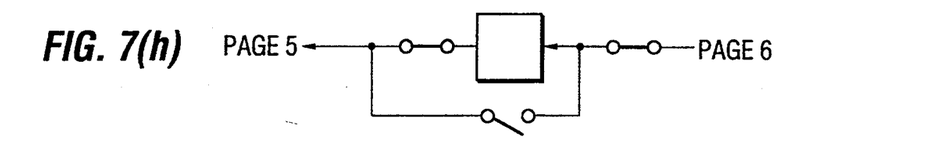

FIG. 6 shows a block diagram of a concealing device in a first embodiment of the invention in the apparatus for recording and reproducing the digital video signal as shown in FIG. 1. This concealing device corresponds to the concealing device 20 shown in FIG. 1. In FIG. 6, numeral 51 denotes a page memory, 52 is a first switch, 53 is a second switch, 54 is a third switch, and 55 is a control signal generator. FIG. 7 shows the operation of the concealing device of this embodiment. In FIG. 7, the control signal generator 55 is omitted, but on the basis of the error detection signal showing the data to be concealed, a signal is generated for performing the following control. The error detection signal is generated by the reproducing signal processor 17 shown in FIG. 1. Suppose there is an error to be concealed in pages 3, 4. FIG. 7 (a) denotes an ordinary state, in which the written signal is delivered from the page memory 51 by one page behind. FIG. 7 (b) is the concealing state by the data of the preceding page, in which the data of page 2 read out from the page memory 51 is fed back to the page memory 51, instead of the data to be concealed in page 3. In FIG. 7 (c), it is not necessary to conceal, and it is an ordinary state. In FIG. 7 (d), there is no data to be replaced with the data to be concealed on page 4, and when the page memory 51 is prohibited from writing. In this state, the first switch 52 and the third switch 54 are not particularly defined in state unless they are turned on simultaneously. In FIG. 7 (e), it is not necessary to conceal, and it is an ordinary state. FIG. 7 (f) is the concealing state by the data of the succeeding page, and instead of the data to be concealed in page 4, the data of page 5 bypassing the page memory 51 is delivered. In FIG. 7 (g), it is not necessary to conceal, and it is an ordinary state. FIG. 7 (h) is an ordinary state, in which the written signal is delivered from the page memory 51 by one page behind. In the sequence of (a)→[(b) or (c)]→[(d) or (e)]→[(f) or (g)]→(h), the state is changed over in every page. In this constitution, by only one page memory, concealing can be effected from either preceding or succeeding page.

Figure 8:
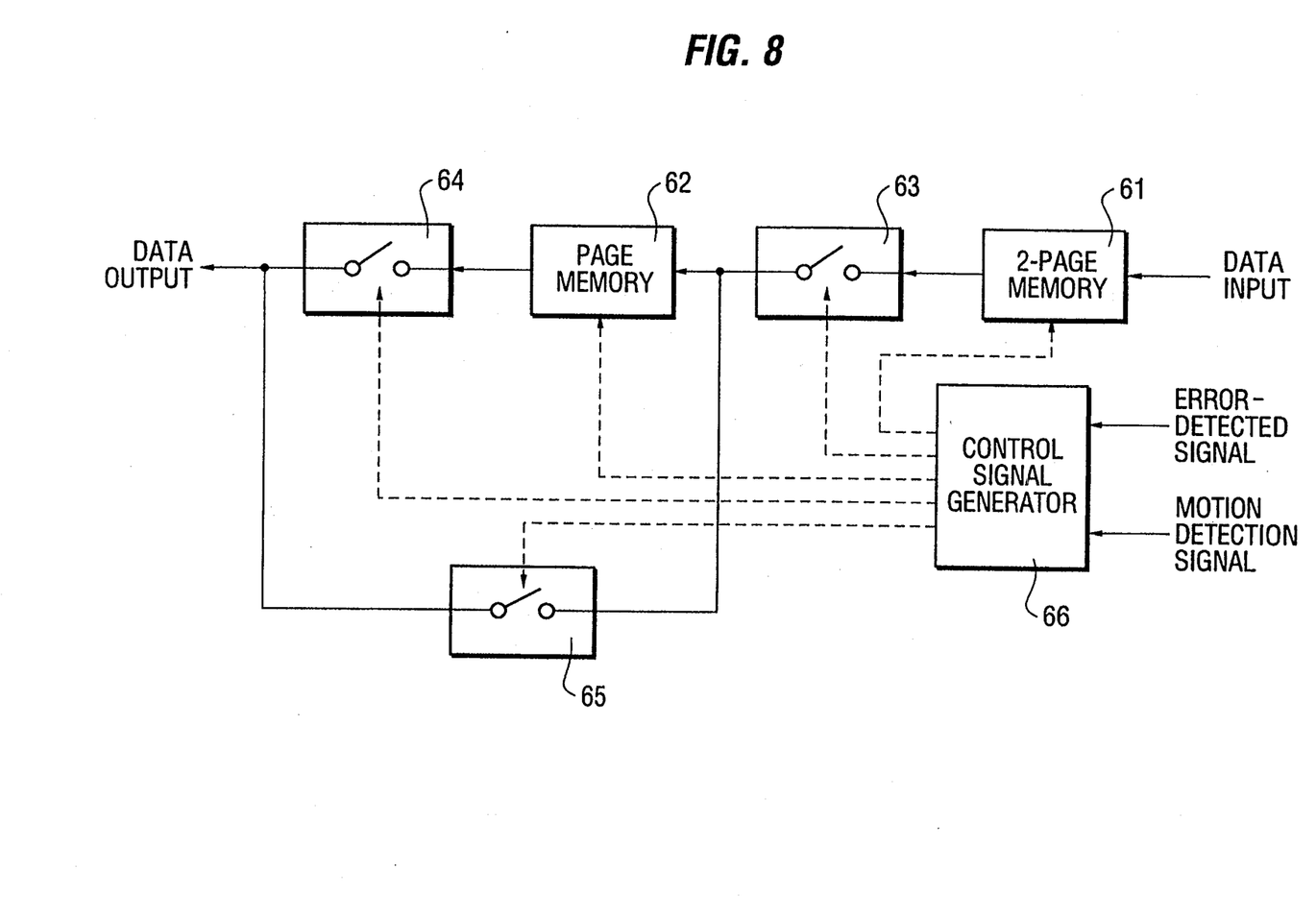
FIG. 8 is a block diagram of a concealing apparatus in a second embodiment of the invention.

Meanwhile, the constitution shown in FIG. 6 is only an example, and in other constitutions, trick-play processing, composing, or time axis adjustment may be possible, aside from concealing, FIG. 8 is a block diagram of a concealing device of a second embodiment of the invention, in the apparatus for recording and reproducing a digital video signal as shown in FIG. 1. In FIG. 8, numeral 61 denotes a two-page memory, 62 is a page memory, 63 is a first switch, 64 is a second switch, 65 is a third switch, and 66 is a control signal generator. This concealing device corresponds to the concealing device 20 in FIG. 1, except that the two-page memory 61 may be shared with the memory necessary in the reproducing signal processor 17 or composing device 19. The operation of the concealing device of this embodiment is as follows. First, assuming that pages n and n+1 are combined, the first page (page n) of the data to be concealed is replaced by the data of two pages before (page n−1), and the second page (page n+1) of the data to be concealed is replaced by the data of two pages before (page n−1), by using the two-page memory 61. On the basis of the motion detection signal, in the control signal generator 66, still picture and moving picture are distinguished, and if judged to be moving picture, it is concealed in the same procedure as in the first embodiment by the page memory 62, first switch 63, second switch 64, and third switch 65. If judged to be a still picture, in the page memory 62, the written signal is delivered by delaying for one page and it is already concealed. This motion detection signal is determined while comparing the data of pages in the bit rate reduction decoding device 18 or composing device 19. If a motion detection signal is used in the bit rate reduction, it may be used. In this constitution, while switching over the concealing method depending on the moving picture and still picture by the page memory alone, concealment may be effected from the preceding page or succeeding page.

The constitution shown in FIG. 8 is only an example, and, in other constitutions, trick-play processing, composing, or time axis adjustment may be possible, aside from concealing.

Figure 9:
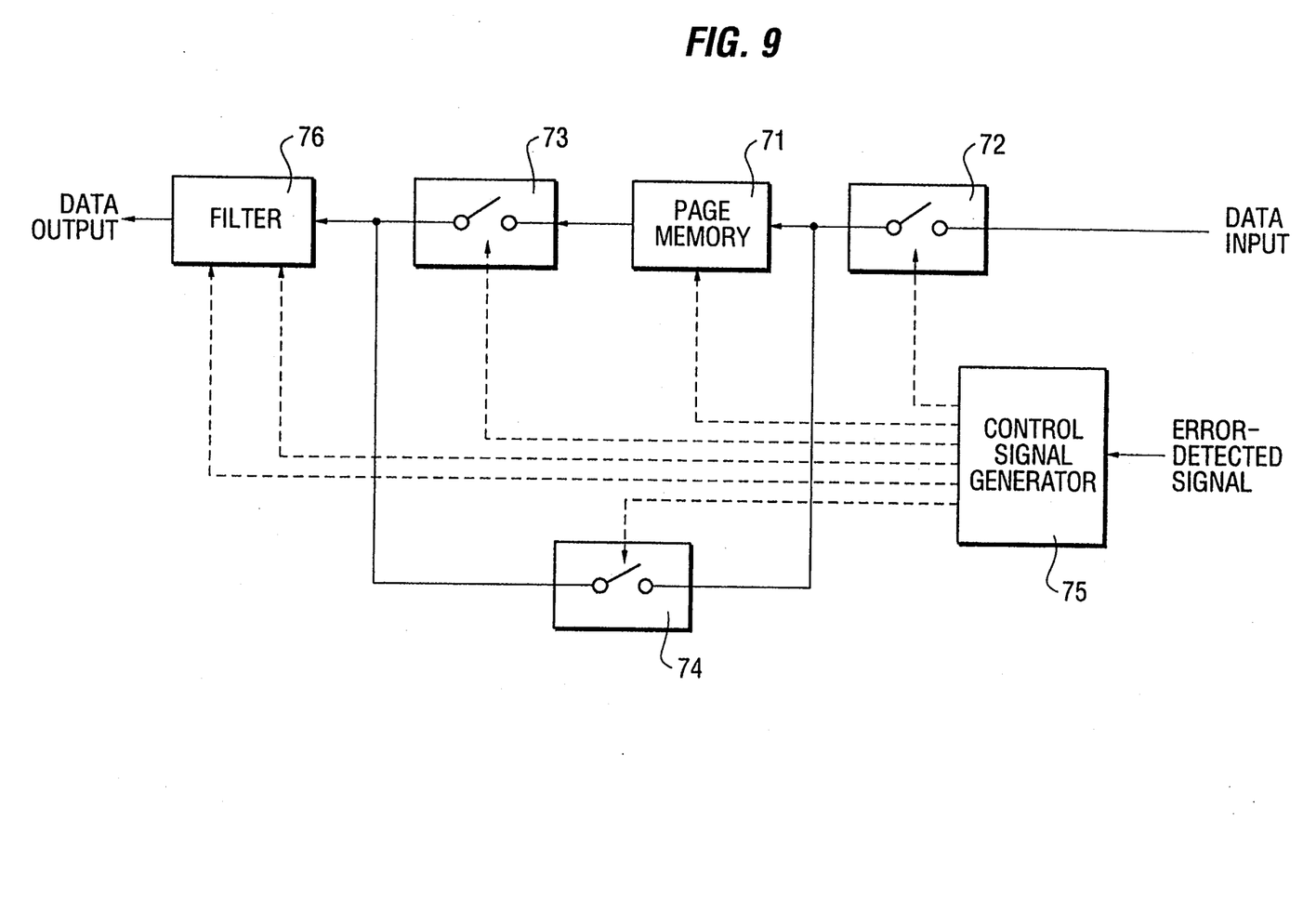
FIG. 9 is a block diagram of a concealing apparatus in a third embodiment of the invention.

FIG. 9 is a block diagram of a concealing device in a third embodiment of the invention, in the apparatus for recording and reproducing a digital video signal as shown in FIG. 1. In FIG. 9, numeral 71 denotes a page memory, 72 is a first switch, 73 is a second switch, 74 is a third switch, 75 is control signal generator, and 76 is a filter. This concealing device corresponds to the concealing device 20 in FIG. 1, and the page memory 71, first switch 72, second switch 73, third switch 74, and control signal generator 75 corresponds respectively to the page memory 51, first switch 52, second switch 53, third switch 54, and control signal generator 55 in the block diagram of the first embodiment. The operation of the concealing device of this embodiment is same as in the first embodiment as for the page memory 71, first switch 72, second switch 73, third switch 74 and control signal generator 75. Feeding the output into the filter 76, the discontinuity is concealed on the borderline of the group of pixels replaced by the preceding page or succeeding page and its surrounding pixels. In this constitution, concealing of smooth motion is achieved.

The constitution shown in FIG. 9 is only an example, and in other constitutions, trick-play processing, composing or time axis adjustment may be possible, aside from concealing. In this embodiment, the filter is placed after execution of the first concealing method, but similar effects may be obtained by placing the filter after executing the second concealing method.

Figure 10:
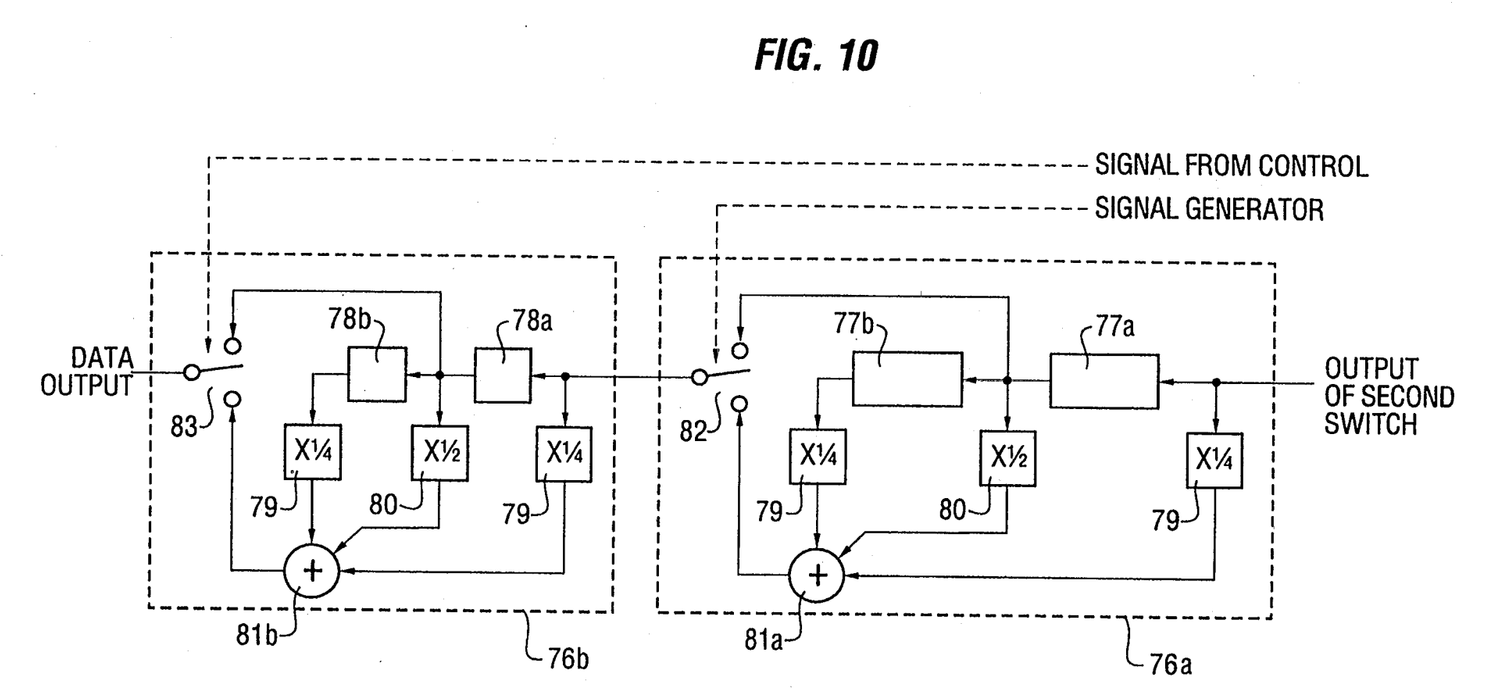
FIG. 10 is a block diagram of a filter in the third embodiment of the invention.
Figure 11A:
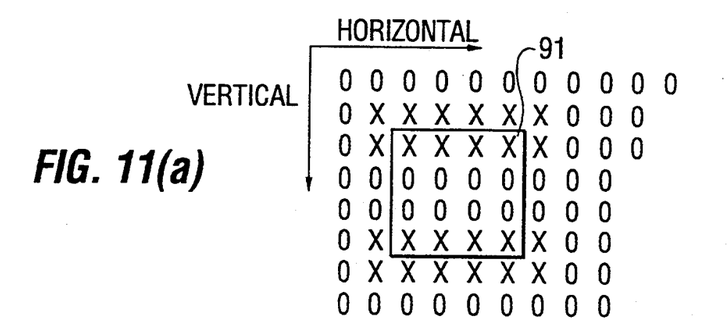
Figure 11B:
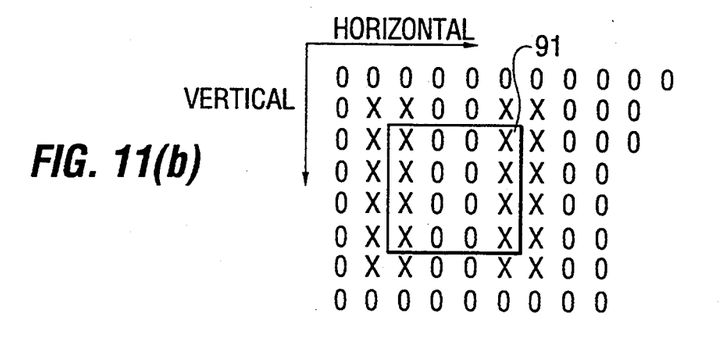
Figure 11C:
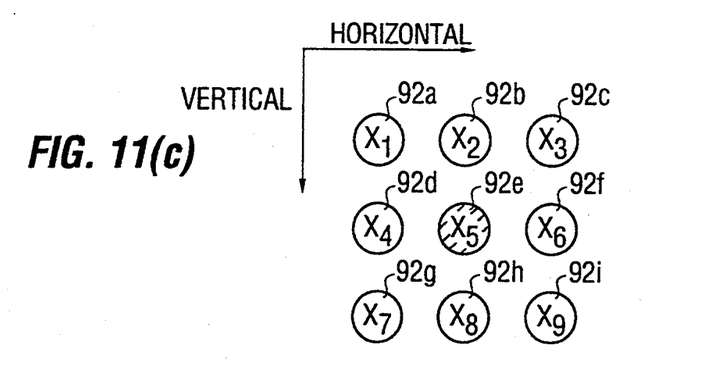

An example of the filter 76 used in the concealing device of the third embodiment of the invention is shown in FIG. 10. In FIG. 10, 76a is a vertical filter, 76b is a horizontal filter, 77a, 77b are line memories, 78a, 78b are D-flip-flop (DFF), 79 is a ½ multiplier, 80 is a ¼ multiplier, 81a, 81b are adders, 82 is a vertical filter changeover switch, and 83 is a horizontal filter changeover switch. FIG. 11 is an operation explanatory diagram of the filter 76. In FIG. 11, numeral 91 is a rectangular part of a screen replaced by the preceding page or succeeding page before input into the filter 76, and 92a to 92i are pixels arranged in 3×3, and the value of each pixel is supposed to be $x_1$ to $x_9$. In the vertical filter 76a, when the output of the line memory 77a is the pixel 92e, the input of the line memory 77a is the pixel 92h, and the output of the line memory 77b is the pixel 92b. At this time, by the vertical filter changeover switch 82, the value $x_5$ of the pixel 92e is converted into the calculation result of $(x_2+2 \cdot x_5+x_8)/4$ by the adder 81a. The pixel of which value is to be changed is only the pixel located at the x-position in FIG. 11 (a), that is, the pixel near the upper end and lower end of the rectangular part of screen 91 being replaced. Likewise, in the horizontal filter 76b, when the output of the DFF 78a is the pixel 92e, the input of the DFF 78a is the pixel 92f, and the output of the DFF 78b is the pixel 92d. At this time, in the horizontal filter changeover switch 83, the value $x_5$ of the pixel 92e is converted into the addition result $(x_4+2 \cdot x_5+x_6)/4$ by the adder 81b. The pixel of which value is to be changed is only the pixel located at the x-position in FIG. 11 (b), that is, the pixel near the left end and right end of the rectangular part of screen 91 being replaced.

The filter 76 shown in FIG. 10 is a two-dimensional filter, but it may be also a one-dimensional filter or three-dimensional filter. The number of taps and coefficients in the vertical filter 76a, and the number of taps and coefficients in the horizontal filter 76b and also arbitrary. The range of the pixels for changeover action of the vertical filter changeover switch 82 and horizontal filter changeover switch 83 is also arbitrary, and not depending on the position of the pixel alone, by comparing, for example, the original value and the filtered value, it is possible to operate adaptively. In FIG. 11, meanwhile, the data range to be replaced is 4×4 pixels, but this number is also arbitrary.

What is claimed is:

1. A method of concealing a coded digital video signal, said coded digital video signal having been obtained by dividing a digital video signal into a plurality of pages each being composed of K fields of pixel data, where K is an integer, decomposing pixel data in each two pages of said plurality of pages into a plurality of blocks each being composed of a predetermined number of pixel data, and encoding said pixel data in each of said plurality of blocks by bit rate reduction encoding and error correction encoding, the encoded result being said coded digital video signal, said method comprising the steps of:

decoding said coded digital video signal to obtain reproduced blocks of pixel data and detecting an error block containing an error among said reproduced blocks;

composing said reproduced blocks of pixel data to obtain a plurality of reproduced pages of pixel data; and concealing error pixel data having been contained in said error block in each two reproduced pages from among said plurality of reproduced pages, wherein said concealing step includes concealing said error pixel data in a first page of said two reproduced pages by placing said error pixel data in said first page with first new pixel data obtained using pixel data in a previous page located one page before said first page and concealing said error pixel data in a second page of said two reproduced pages by replacing said error pixel data in said second page with second new pixel data obtained using pixel data in a succeeding page located one page after said second page.

2. A method according to claim 1, wherein each of said pages is composed of one field of pixel data.

3. A method according to claim 1, wherein said concealing step includes obtaining the first new pixel data used to replace said error pixel data in said first page by using said pixel data in said previous page and pixel data spatially adjacent to said error pixel data in said first page, and obtaining said second new pixel data used to replace said error pixel data in said second page by using said pixel data in said succeeding page and pixel data spatially adjacent to said error pixel data in said second page.

4. A method according to claim 3, wherein each of said pages is composed of one field of pixel data.

5. A method according to claim 1, wherein said concealing step includes obtaining as the first new pixel data used to replace said error pixel data in said first page pixel data located at the same position in said previous page, and obtaining as the second new pixel data used to replace said error pixel data in said second page pixel data located at the same position in said succeeding page.

6. A method according to claim 5, wherein each of said pages is composed of one field of pixel data.

7. A method of concealing a coded digital video signal, said coded digital video signal having been obtained by dividing a digital video signal into a plurality of pages each being composed of K fields of pixel data, where K is an integer, decomposing pixel data in each two pages of said plurality of pages into a plurality of blocks each being composed of a predetermined number of pixel data, and encoding said pixel data in each of said plurality of blocks by bit rate reduction encoding and error correction encoding, the encoded result being said coded digital video signal, said method comprising the steps of:

decoding said coded digital video signal to obtain reproduced blocks of pixel data and detecting an error block containing an error among said reproduced blocks;

composing said reproduced blocks of pixel data to obtain a plurality of reproduced pages of pixel data;

detecting whether a picture formed by each two reproduced pages of said plurality of reproduced pages is a moving picture or a still picture; and concealing error pixel data having been contained in said error block in each two reproduced pages depending on a detection result of said detection step, wherein, when said picture is detected as a moving picture, said concealing step includes concealing said error pixel data in a first page of said two reproduced pages by replacing said error pixel data said first page with first new pixel data obtained using pixel data in a previous page located one page before said first page and concealing said error pixel data in a second page of said two reproduced pages by replacing said error pixel data in said second page with second new pixel data obtained using pixel data in a succeeding page located one page after said second page, and wherein, when said picture is a still picture, said concealing step includes concealing said error pixel data in said first page by replacing said error pixel data with pixel data at the same position in a page located two pages before said first page and concealing said error pixel data in said second page by replacing said error pixel data with pixel data at the same position in a page located two pages before said second page.

8. A method according to claim 7, wherein each of said pages is composed of one field of pixel data.

9. A method according to claim 7, wherein, when said picture is detected as a moving picture, said concealing step includes obtaining said first new pixel data used to replace said error pixel data in said first page by using said pixel data in said previous page and pixel data spatially adjacent to said error pixel data in said first page, and obtaining said second new pixel data used to replace said error pixel data in said second page by using said pixel data in said succeeding page and pixel data spatially adjacent to said error pixel data in said second page.

10. A method according to claim 9, wherein each of said pages is composed of one field of pixel data.

11. A method according to claim 7, wherein, when said picture is detected as a moving picture, said concealing step includes obtaining as the first new pixel data used to replace said error pixel data in said first page pixel data located at the same position in said previous page, and obtaining as the second new pixel data used to replace said error pixel data in said second page pixel data located at the same position in said succeeding page.

12. A method according to claim 11, wherein each of said pages is composed of one field of pixel data.

* * * * *